Figure 1:
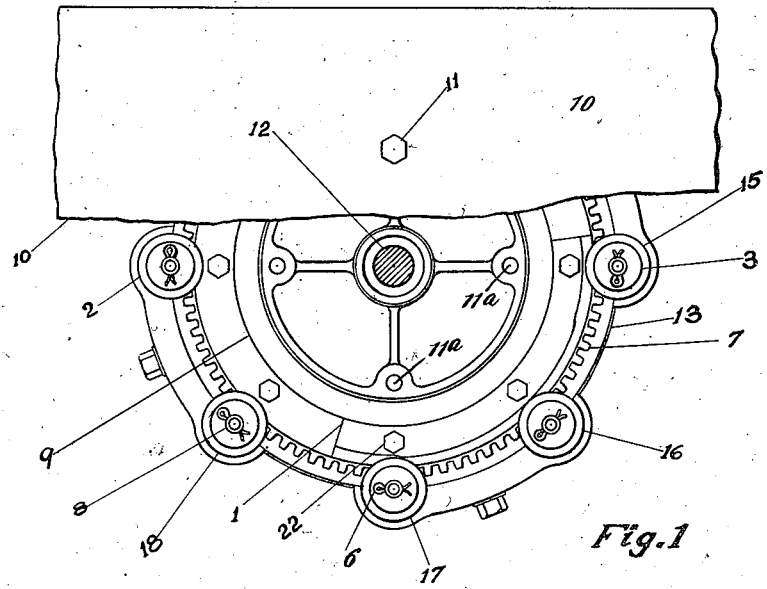

B. C. CALDERWOOD.
CLUTCH MECHANISM FOR STARTING AND STOPPING THE ROTARY MOTION OF PICKING FINGERS IN COTTON PICKING MACHINES.
APPLICATION FILED APR. 30, 1913.

1,174,387.

Patented Mar. 7, 1916.
2 SHEETS—SHEET 1.

Witnesses
Andrew Eskil Rylander
Ralph Olney Smithson

Inventor
Benjamin Crabtree Calderwood

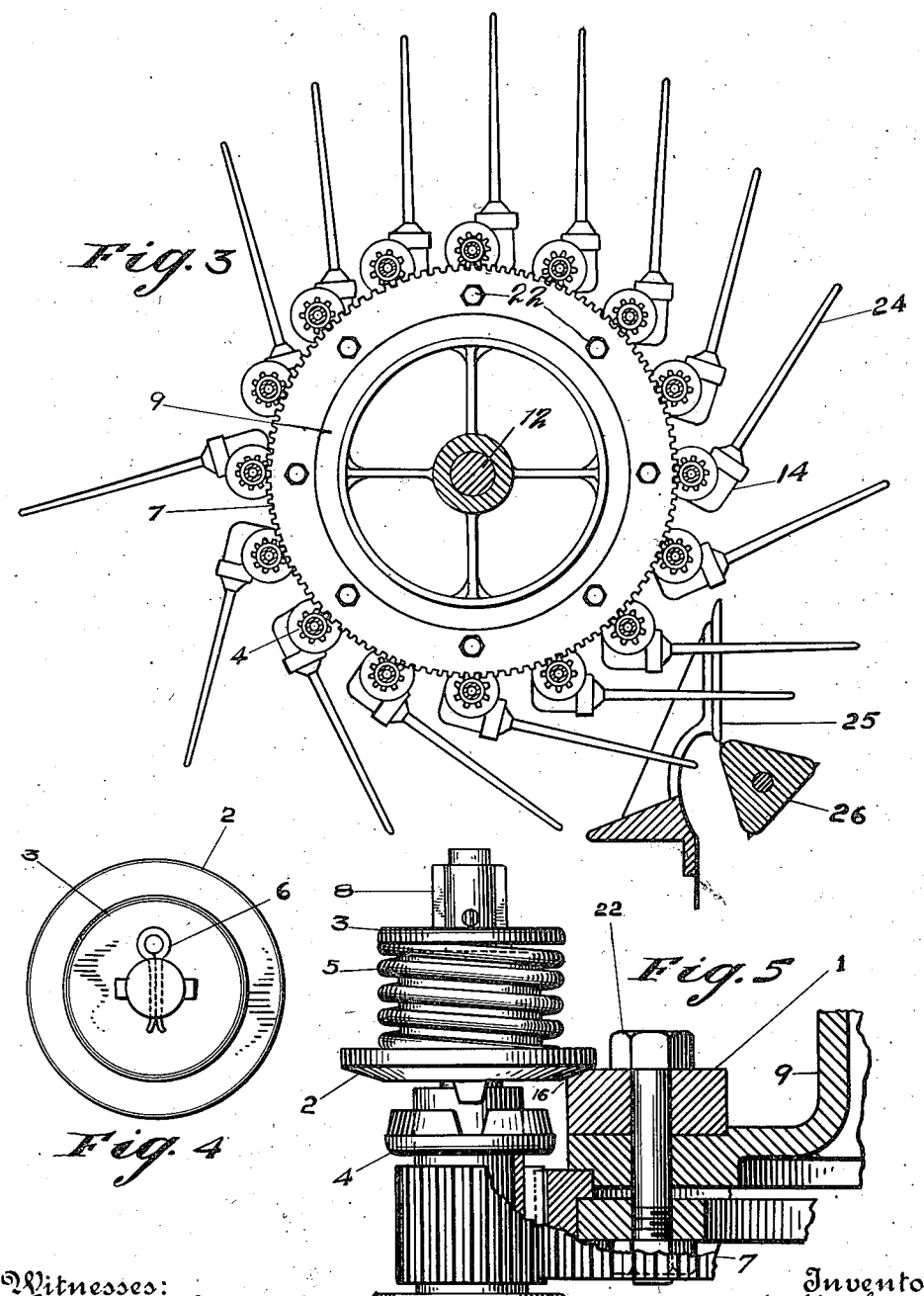

UNITED STATES PATENT OFFICE.

BENJAMIN CRABTREE CALDERWOOD, OF VALLEY FALLS, RHODE ISLAND, ASSIGNOR TO PRICE-CAMPBELL COTTON PICKER CORPORATION, OF NEW YORK, N. Y., A CORPORATION OF DELAWARE.

CLUTCH MECHANISM FOR STARTING AND STOPPING THE ROTARY MOTION OF PICKING-FINGERS IN COTTON-PICKING MACHINES.

1,174,387. Specification of Letters Patent. Patented Mar. 7, 1916.

Application filed April 30, 1913. Serial No. 764,522.

*To all whom it may concern:*

Be it known that I, BENJAMIN CRABTREE CALDERWOOD, a citizen of the United States, residing at Valley Falls, in the county of Providence and State of Rhode Island, have invented certain new and useful Improvements in Clutch Mechanisms for Starting and Stopping the Rotary Motion of Picking-Fingers in Cotton-Picking Machines, of which the following is a specification.

My invention relates to improvements in a clutch mechanism for starting and stopping the rotary motion of the picking fingers in cotton-picking machines whereby a number of coöperating pinion clutches revolve freely upon their respective shafts, and engage the teeth of clutches keyed to and sliding (with a vertical reciprocating motion) on the same shafts and directly over and above the pinion clutches. The pinion clutches are in constant mesh with a circular gear ring mounted on a fixed drum center, and with the clutches, revolve around a common and equidistant center. As the fingers approach the stripping mechanism the clutches rise on the arc of a lifting cam, thereby throwing the clutches out of engagement with the pinion clutches, allowing the latter to rotate freely upon their shafts, while the clutches with the keyed shaft remain stationary in relation to any rotary motion until they slide off the lifting cam and again engage with the pinion clutches, when the shafts resume rotary motion. The rotary motion of the shafts, which each carry a series of spiral gears, and the lower portions of which are inclosed in the carriers, is transmitted to the picking fingers by a series of spiral pinions in each of the several carriers, and into which the fingers are socketed and keyed.

The objects of my invention are: first, to impart an intermittent rotary motion to the picking fingers in cotton-picking machines; second, to insure a positive rotary motion during the time the picking fingers engage the plant; third, to stop said rotary motion as the fingers approach and pass through the stripping mechanism for the purpose of removing the cotton from the fingers; fourth, to secure a minimum of shook and vibration by keeping the combined pinion and clutches in continuous engagement with the fixed circular gear ring; and fifth, to accomplish these objects in a manner which will permit of speedy repairs and interchange of parts. I attain these objects by the means illustrated in the accompanying drawings, in which—

Figure 2:
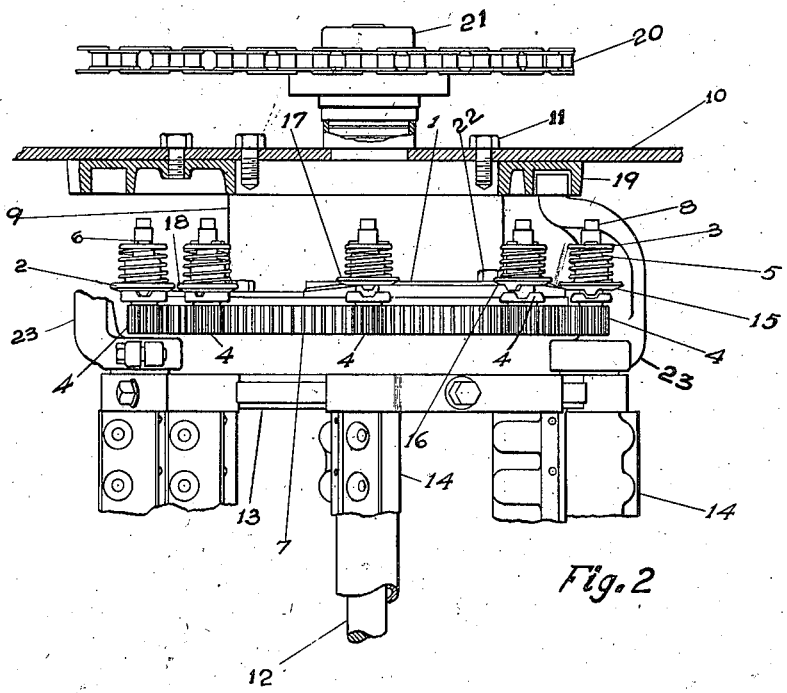

Figure 1 is a top view of the drum with a portion of the top drum plate removed, showing the lifting cam in its relation to the drum and the fixed gear ring, with a clutch about to mount the lifting cam, one riding the cam with the clutch teeth disengaged; a clutch about to reëngage with the pinion clutch, and two clutches in full engagement with the pinion clutches. Fig. 2 is an elevational view of the clutch mechanism, with the top drum plate and the main translating cam cut through the center line. It also shows the combined clutch pinions in mesh with the fixed circular gear ring, and the relationship of the clutch and pinion clutch in various positions. The upper carrier wheel is also shown in this view, together with a portion of the top of the carriers with the picking fingers removed. In this view is also shown the driving chain and the drum shaft, to which is keyed the carrier wheel. Fig. 3 is a top view of the drum center, showing the pinion clutches in mesh with the fixed circular gear ring, the picking fingers in position in the carriers, and illustrates the position of the picking fingers while in the plant and in position for stripping of the cotton. Fig. 4 is a top view of the clutch, with the thrust collar for the tension spring on top. Fig. 5 shows one of the clutches riding on the lifting cam, with the clutch teeth out of engagement with the pinion clutch. This view also shows the manner in which the clutch slides with a vertically reciprocating motion on the keyed shaft.

In the drawings, 1 is the lifting cam for lifting the clutches out of engagement with the combined pinion and clutches; 2 are the clutches, 3 the collars taking the thrust from the clutch tension springs, 4 the combined pinion and clutches, and 5 the clutch tension springs.

6 are the cotter pins which hold the collars 3 in place.

7 is the fixed circular gear ring, around which revolve the combined pinion and clutches 4; 8 the upper part of spiral gear shafts in the picker-finger carriers, both well known, and 9 the drum center to which is attached the lifting cam 1 and the fixed circular gear ring 7, and around which revolves the picking mechanism.

10 is the upper drum plate, and 11 the screws by which the drum center 9 is bolted to the drum top frame 10.

12 is the drum shaft; 13 and 14 a small portion of the carriers with the picking fingers removed.

15 shows a clutch in the act of rising on the lifting cam 1; 16 a clutch riding on the lifting cam 1 with the clutch teeth out of engagement, causing the shaft 8 to cease rotating; 17 a clutch about to slip down the incline on the lifting cam 1, and 18 is a clutch off the lifting cam 1 and in full engagement with the pinion clutches 4.

19 is the main translating cam for determining the position of the picking fingers while engaged in the plant and during the period when they are passing through the stripping mechanism.

20 is the driving chain, 21 the drum shaft driving chain sprocket coupling, 22 the bolts which hold the cam 1 in position on the drum center 9, and 23 the main cam arms, which are keyed to the carriers 14.

24 are the picking fingers.

25 is the stripping mechanism, and 26 the spike roller which propels the cotton during the stripping process into the elevating mechanism.

What I claim is,—

1. The combination of a clutch mechanism for starting and stopping the rotary motion of picker fingers in cotton-picking machines; a fixed circular gear ring mounted on a fixed circular drum center; a lifting cam mounted on a fixed circular center; a series of pinion-clutches each on a shaft and severally in constant mesh with the fixed gear ring; a series of cotton-picker fingers operatively connected for rotating them with each of said shafts; a series of clutch members having intermittent engagement with the pinion-clutches *seriatim;* and a cam for disconnecting the clutch mechanism from the pinion-clutches, the latter rotating freely upon their respective shafts during such disengagement.

2. The combination of a fixed circular drum; a lifting cam mounted thereon; and a series of rotating clutches arranged to engage the lifting cam *seriatim* and to be lifted thereby; a series of traveling picker-finger carriers each provided with a series of rotatable picker-fingers; a shaft for giving rotation to each series of picker fingers; a clutch member carried by each shaft and adapted for periodic engagement with each of said series of clutches during the approach of the picker fingers and while passing through stripping mechanism; and such stripping mechanism.

In testimony whereof I have hereunto set my hand in the presence of two subscribing witnesses, this 25th day of April, 1913.

BENJAMIN CRABTREE CALDERWOOD.

Witnesses:
G. BLAKE,
WILLIAM J. DODGE.